United States Patent [19]

Ludecke et al.

[11] 4,211,075
[45] Jul. 8, 1980

[54] DIESEL ENGINE EXHAUST PARTICULATE FILTER WITH INTAKE THROTTLING INCINERATION CONTROL

[75] Inventors: Otto A. Ludecke; Theodore L. Rosebrock, both of Rochester, Mich.

[73] Assignee: General Motors Corporation, Detroit, Mich.

[21] Appl. No.: 952,710

[22] Filed: Oct. 19, 1978

[51] Int. Cl.² .................................................. F01N 3/10
[52] U.S. Cl. ........................................ 60/285; 60/288; 60/303; 60/311
[58] Field of Search ................ 60/285, 282, 296, 311, 60/303, 288, 294; 123/140 MC, 139 BG

[56] References Cited

U.S. PATENT DOCUMENTS

| | | | |
|---|---|---|---|
| 3,499,269 | 3/1970 | Bois | 60/297 |
| 3,605,711 | 9/1971 | Fuso | 123/140 MC |
| 3,937,015 | 2/1976 | Adako | 60/282 |
| 4,058,101 | 11/1977 | Taira | 123/140 MC |
| 4,167,852 | 9/1979 | Ludecke | 60/296 |

FOREIGN PATENT DOCUMENTS

| | | | |
|---|---|---|---|
| 588160 | 12/1959 | Canada | 60/286 |
| 363081 | 12/1931 | United Kingdom | 123/139 BG |

Primary Examiner—Douglas Hart
Attorney, Agent, or Firm—Robert J. Outland

[57] ABSTRACT

Diesel exhaust filter and incineration control systems are disclosed which provide intake throttling of the diesel engine as a primary means of raising exhaust temperature in the filter for the periodic burn-off of collected particulates. Various embodiments and supplemental means of increasing exhaust temperatures are also disclosed.

6 Claims, 5 Drawing Figures

DIESEL ENGINE EXHAUST PARTICULATE FILTER WITH INTAKE THROTTLING INCINERATION CONTROL

Technical Field

This invention relates to diesel engine exhaust gas treatment, in particular to the filtering of particulates from diesel engine exhaust gases and, more specifically, to the periodic incineration of collected particulates in the filter through temporarily increasing exhaust gas temperature with a system including throttling of the engine air intake.

BACKGROUND OF THE INVENTION

It is known in the art to provide a diesel engine with exhaust filter means comprising a particulate trap to collect particulates from the exhaust gas stream during the engine operation. Such particulates consist largely of carbon particles which, with continued operation, tend to plug the exhaust filter, causing a restriction to normal exhaust gas flow. Such a restriction may be avoided by periodically cleaning the particulates from the exhaust gas filter.

The cleaning of particulates from an exhaust filter may be accomplished by any practical method. One suggested method is incineration in place, brought about by increasing the engine exhaust gas temperature to the combustion temperature of the collected particulates. This may be accomplished, for example, by heating the exhaust gas stream in the manner disclosed in the co-pending United States patent application Ser. No. 872,360 filed Jan. 26, 1978, now U.S. Pat. No. 4,167,852, in the name of Otto A. Ludecke and assigned to the assignee of the present invention.

Under some circumstances, the normal operating temperature of the diesel engine exhaust gases may be sufficiently high to incinerate collected particulates in an appropriately located exhaust filter. For example, U.S. Pat. No. 3,937,015 Adako et al discloses a particular construction of exhaust manifold mounted filter which, it is asserted, will be cleaned by the burning of collected carbon particles caused by high exhaust gas temperatures reached during heavy load operation of the engine. However, such a system does not provide control of the frequency or extent of the burn periods nor of the maximum temperatures reached which, if these are excessive, may shorten the life of or permanently damage the exhaust filter element.

Also, in some engine applications, particularly those for use in lighter automotive vehicles, operation under heavy load may rarely occur. In this case, the engine exhaust temperatures may not be sufficient to burn off collected particulates at the time such action is desirable. For example, in a currently produced automotive diesel engine operated in simulated city driving conditions at 25 miles per hour road load, the exhaust manifold temperature was measured at only 360° F., which is far below the temperature of approximately 900° F. required to incinerate trapped particulates from a filter device in the exhaust. Thus, in order to adequately control the periods and temperatures of incineration, we consider it desirable to provide controllable means for increasing the exhaust gas temperature to accomplish the desired periodic burn off of particulates.

SUMMARY OF THE INVENTION

We have found that a substantial increase in the exhaust gas temperature of a diesel engine may be obtained by partially throttling the engine air intake, thus reducing the excess air passing through the engine. Since diesel engines normally run unthrottled, load control is generally accomplished by varying the fuel input to the engine, without a like variation in the amount of air flow. In addition, the combustion characteristics of fuel injected engine cylinders require for proper combustion that a certain amount of air in excess of the stoichiometric requirements be supplied to the engine under all operating conditions. Accordingly, reduction of the engine load from the full fuel operating condition results in a substantial increase of the amount of excess air which passes through the engine, resulting in much lower exhaust gas temperatures than are normally found in comparable gasoline engines.

The present invention provides intake throttling means as a main element of an exhaust filter particulate incineration control system provided to periodically burn off collected particulates from an exhaust filter. While the intake throttle is utilized as a primary method of increasing exhaust temperature, other means may also be included to provide additional increases in exhaust temperature where necessary. Such means may include for example heating devices in the engine exhaust system or devices to modify operation of the engine by cutting out cylinders, retarding timing, providing excess fuel or any combination of these and other features needed to accomplish the desired purposes. By properly combining such features in an overall control system, it is possible to provide controlled incineration of particulates at predetermined desirable intervals and to control the incineration temperatures to avoid impairing the life of the exhaust filter.

These and other features and advantages of the invention will be more fully understood from the following description of certain preferred embodiments, taken together with the accompanying drawings.

BRIEF DESCRIPTION OF THE DRAWINGS

In the drawings:

FIG. 3b is an end view partially in section of the embodiment of FIG. 3a; and

BEST MODE FOR CARRYING OUT THE INVENTION

Figure 1:
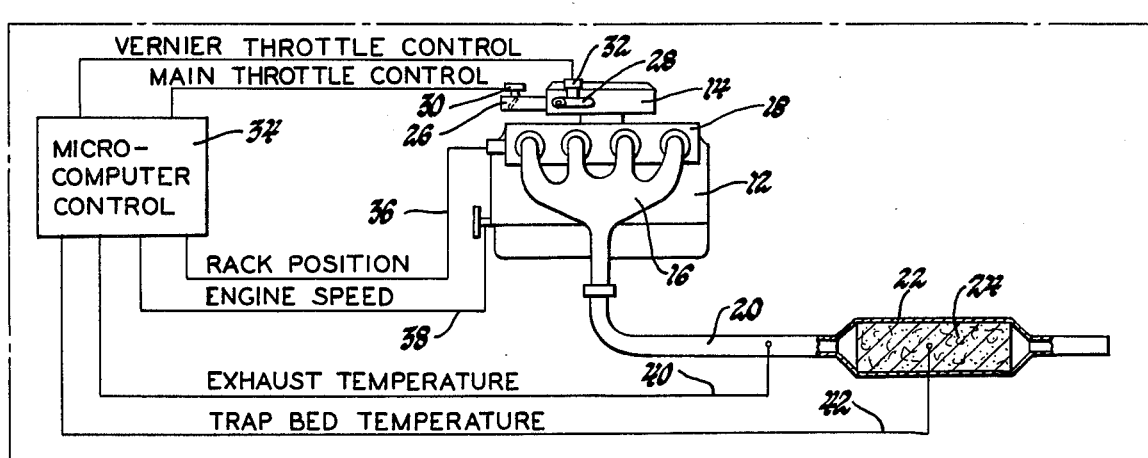
FIG. 1 is a schematic view of an internal combustion engine with a particulate trap and incineration control system formed in accordance with the present invention.

Referring now to the drawings in detail, FIG. 1 illustrates a preferred embodiment of the invention as installed in an automotive vehicle generally indicated by numeral 10. Vehicle 10 is driven in conventional fashion by a diesel engine 12 having an air induction system including an air cleaner 14 and a combustion products exhaust system including an exhaust manifold 16 connecting with individual exhaust ports in the side of an engine cylinder head 18. The exhaust manifold connects with an exhaust pipe 20 in which there is mounted a particulate trap 22 containing at least one filter element 24 through which the exhaust gases from the engine are required to pass.

The filter element or elements 24 may be made of any suitable material and configuration capable of trapping and holding substantial quantities of particulates from the engine exhaust gases without creating an excessive restriction to exhaust gas flow and able to withstand the elevated temperatures to be reached in the subsequent incineration of particulates during engine operation. Examples of materials which may be suitable for such a purpose are ceramic beads, monolithic ceramic structures, metal wire mesh or multiple screen elements such as of stainless steel; however, any other suitable materials and structures may also be utilized. At present we prefer to utilize alumina coated stainless steel wire packed into a container to form the desired filter material. The alumina material may be of the type disclosed in U.S. Pat. No. 3,231,520 to Leak and Le Bleu except that the catalytic coating referred to in the patent is not applied to the wire.

In order to provide for periodic removal of particulates from the particulate trap 22 by incineration, the vehicle 10 is provided with a particulate incineration control system including throttling means on the engine air intake. In the present case, to provide a finer degree of control and for test purposes, the air cleaner 14 is provided with a conventional main air inlet tube 26 and a second smaller auxiliary air inlet tube 28. Inlet tube 26 is further provided with a main throttle valve and control servo motor 30 which are controllable to open or close, in part or completely, the main inlet to the flow of intake air. In like manner, the auxiliary inlet 28 is provided with a smaller vernier throttle and servo motor control 32 which are operable to open or controllably close the auxiliary inlet 28 to the passage of intake air.

Experience has shown that in normal engine operation the temperature in the exhaust system varies substantially under different conditions of engine load and speed and that, depending upon the position of the particulate trap in the exhaust system, temperatures in the trap may never reach the level required to burn off the particulates collected therein. This is especially true if the engine is seldom operated under full throttle, as is typical of many automotive vehicle applications, or if the particulate trap is mounted externally of the engine exhaust manifold, as is the case in the arrangement shown in FIG. 1 of the drawings. Thus, it is necessary, in order to periodically incinerate the collected particulates, to provide some other means for raising the exhaust temperature to the necessary level of about 900° F.

A number of possible methods may be used singly or in combination in order to obtain the desired temperature levels. One such method which may be used under all engine operating conditions, except the full fuel or full load condition, is throttling of the engine air intake system. We have found that appropriate throttling of the air intake is capable of increasing substantially the engine exhaust temperature and may in some cases be sufficient to raise the temperature in the particulate trap to the incineration level.

This method is utilized in the system disclosed in FIG. 1 of the drawings. Here, the main and vernier throttle servo motors are controlled by means of a microcomputer control 34 having inputs connected with the diesel engine fuel rack position 36, an engine speed sensor 38, an engine exhaust temperature sensor 40 and a particulate trap bed temperature sensor 42, which inputs are processed by the microcomputer to control the position of the throttles in an appropriate manner. The design criteria of this system include the following:

1. The trap must be cleaned out often enough so that the collected particulates do not cause an excessive restriction to exhaust gas flow.

2. The throttling of the engine intake must be controlled so as not to change significantly the driveability or performance of the vehicle.

3. The controlling process should not cause a significant or noticeable increase in smoke emanating from the vehicle exhaust pipe.

4. The burn cycle should be controlled so that only the particulates are incinerated and the bed of the trap is not damaged.

In order to accomplish these purposes, the microcomputer of the present invention is programmed to operate in the following manner:

1. A periodic burn cycle is programmed to begin 150,000 engine revolutions after completion of the previous burn. This is approximately equivalent to 50 kilometers of vehicle travel, and since it should take about 500 kilometers of driving for the trap to become overloaded, the 50 kilometer cleaning interval appears adequate.

2. Since throttling the intake air to the engine decreases the potential power output, the program includes an override in the system that opens all the throttles during a burn cycle, if the driver advances the fuel control to the full rack position. As the driver eases up on the rack, the burn cycle is continued. Also, it is recognized that the maximum limit to which the engine can be throttled without adversely effecting driveability varies with both speed and load. Since these conditions are likely to be changing constantly during any burn cycle, the computer program constantly updates its information as to the speed and load of the engine in order to correct the position of the throttles as required.

3. It has also been found experimentally that throttling of the engine air intake must be limited to avoid creation of excessive exhaust smoke and that the limit on the amount of throttling varies with the engine speed and load. In order to program the computer for a particular engine, the smoke creating conditions for throttling at various speeds and loads must be experimentally determined. The resulting three dimensional curve is then programmed into the computer which then controls the throttles as a function of engine speed and rack position so that the creation of excessive smoke is avoided.

4. To prevent the trap bed from being damaged while particulates are being burned, the computer is further programmed to adjust the throttles to control the rise in temperature in the particulate trap bed to a reasonable rate, to maintain the bed temperature during the burn between 950° and 1,000° F. and to cancel the burn immediately if the bed temperature exceeds 1,200° F., which is still some 300° below the temperature at which the bed itself will burn. If the bed temperature should reach 1,500° F., the computer is programmed to initiate a signal indicating that the trap has been damaged.

Figure 2:
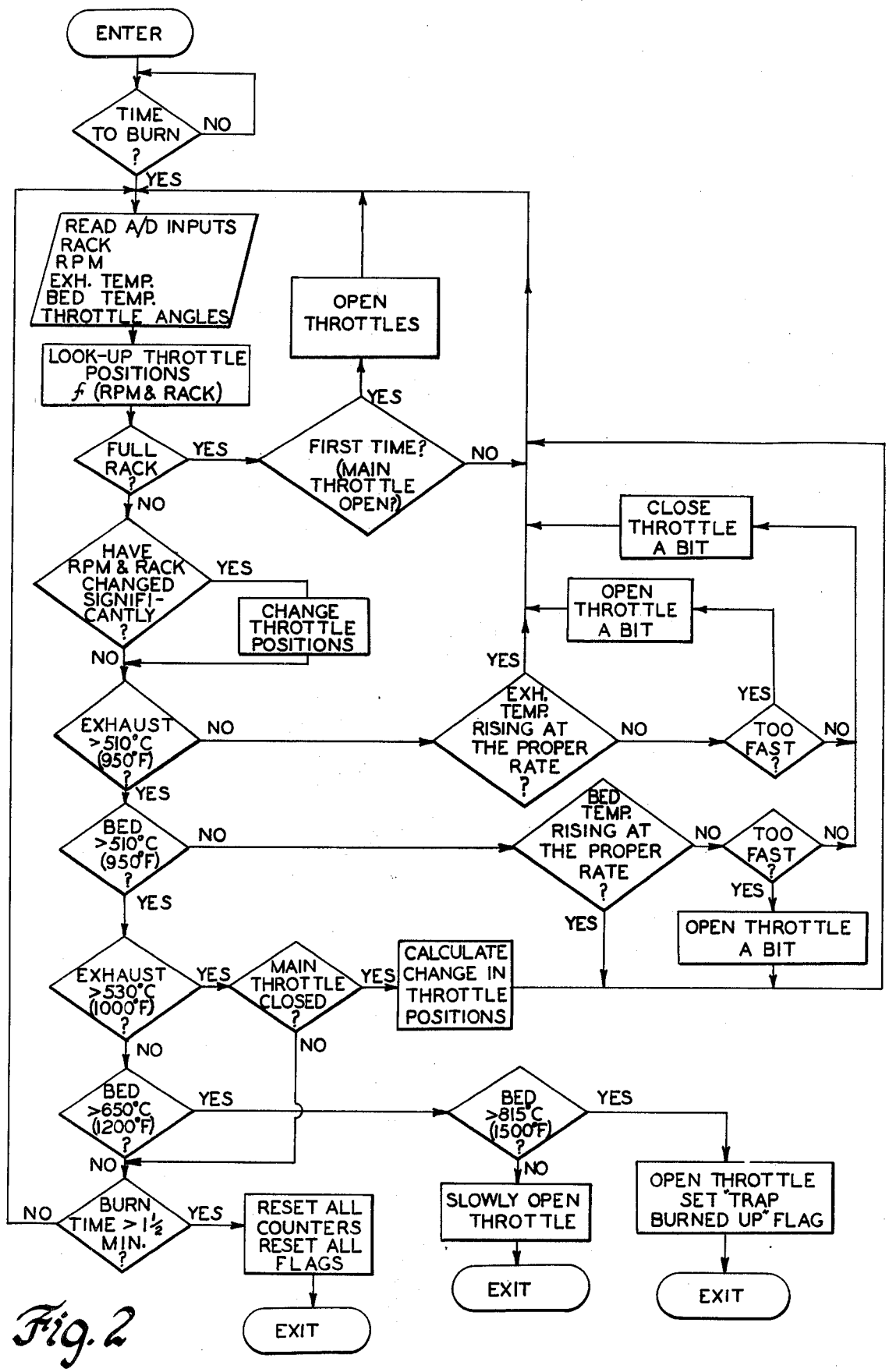
FIG. 2 is a flow diagram of the operational characteristics of a microprocessor controller for the system of FIG. 1.

FIG. 2 comprises a flow diagram of the operation of the control system as pre-established by the programming of the microcomputer, the operation of which is self-explanatory to those knowledgeable in the art.

Figure 3A:
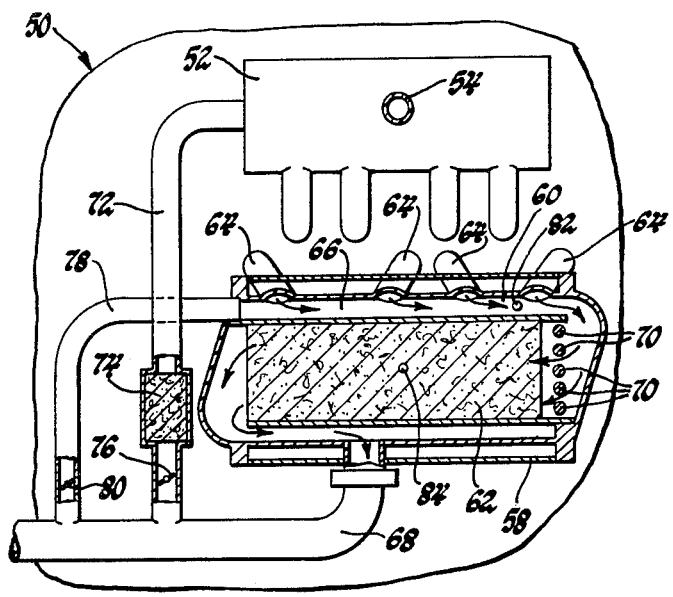
FIG. 3a is a side view partially in section of an alternative embodiment of filter and burner system formed in accordance with the invention.
Figure 3B:
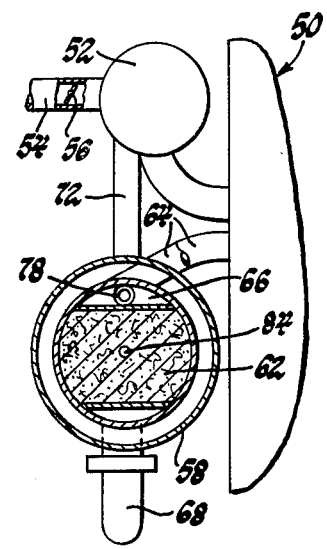

Referring now to FIGS. 3a and 3b of the drawings, there is shown an alternative embodiment of diesel particulate filter and incineration system as applied to an in-line four cylinder engine generally indicated by numeral 50. Engine 50 includes an intake manifold 52 having an inlet pipe 54 with a throttle 56 controlled by any suitable means, not shown. The engine is also provided with an exhaust manifold 58 defining an internal chamber 60 containing a particulate filter element 62. The manifold includes individual inlet legs 64 leading from the four engine exhaust ports to the interior of the manifold 58 where the gas is conducted via a passage 66 to the filter element 62 and thence to an outlet pipe 68. A heating grid 70, which may be electrically operated, is provided at the inlet to the filter element to provide supplemental heat to the system when required.

The outlet pipe 68 connects with an EGR passage 72 by means of which cleaned exhaust gases may be recirculated to the intake manifold 52. An additional trapping element 74 may be provided in the EGR passage, if desired, and flow through the passage is controlled by an EGR valve 76. The system is also provided with a particulate trap bypass line 78 which extends from the inlet passage 66 of the manifold to the outlet pipe 68. A bypass valve 80 is provided in the bypass line to control the flow of exhaust gases around the filter.

Control of this system may be provided by any suitable means such as for example the microcomputer of the arrangement disclosed in FIG. 1. The control inputs include the position of the inlet throttle 56 as well as exhaust back pressure indicated by a sensor 82 in the exhaust manifold and the particulate filter temperature as indicated by a sensor 84 embedded within the filter element.

In operation, a burn off of particulates collected in the exhaust filter is initiated by suitable automatic or manual control means. These close the intake throttle as necessary to increase the temperature in the manifold filter to the combustion temperature of the particulates. The temperature sensor indicates the temperature reached, which may be displayed on a visual indicator viewable by the operator or fed into an automatic control unit that controls the amount of throttling in the manner described for the system of FIG. 1. The bypass line and control valve may be utilized to permit exhaust gas flow to bypass the filter element under conditions such as full throttle where the restriction to flow through the filter may otherwise limit engine horsepower to some extent. The EGR line is provided for use in controlling emissions of oxides of nitrogen in known manner with the supplemental trapping element 74 provided to reduce the possibility of recycling particulates through the engine.

Figure 4:
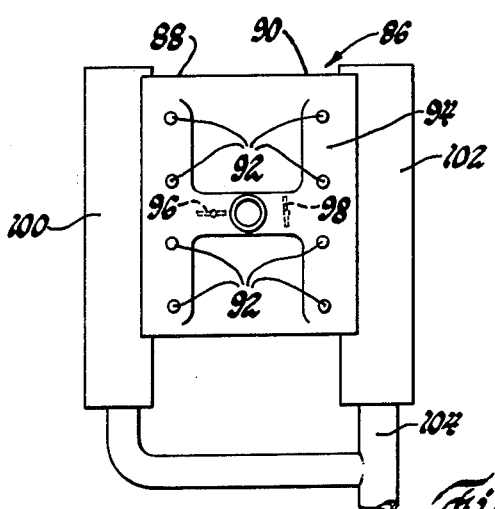
FIG. 4 is a top view of yet another engine with an exhaust filter and burner control system formed in accordance with the principles of the invention.

Referring now to FIG. 4 of the drawings, there is shown another embodiment of the invention with a V-type eight cylinder diesel engine generally indicated by numeral 86. Engine 86 has two banks 88, 90 of cylinders with individual solenoid controlled injectors 92 and an intake manifold 94 supplying air to the cylinders of both banks and incorporating separate intake throttles 96, 98, one for each cylinder bank. The cylinder banks are likewise provided with separate exhaust manifolds 100, 102, each of which incorporates an exhaust particulate trap, the manifolds being provided with outlet pipes connecting with a common exhaust line 104.

In operation, suitable controls, not shown, are provided for controlling both the intake throttles and the injectors. In normal operation, the intake throttles would both be fully opened and the injectors would operate normally to provide equal amounts of fuel to all cylinders. However, when a periodic burn off of particulates in the particuate traps is desired, one of the throttles is closed and the injectors on the associated bank are shut off so that the engine then operates completely with power developed in the other active cylinder bank. The increased load on the four cylinders of the active bank raises the exhaust temperature in this bank a significant amount which may be sufficient to burn off the particulates in the trap located in the exhaust manifold of that cylinder bank. If this is not sufficient, the throttle of the active bank may be partially closed so as to limit air flow to that bank and further increase the exhaust temperature in the manner of the previously described embodiments.

Additionally, if desired, any of the engine embodiments disclosed may be controlled in a manner whereby certain of the injectors are shut off to reduce the number of active cylinders driving the vehicle. This combined with throttling the air can increase the exhaust temperature without the need for a split cylinder arrangement as shown in the embodiment of FIG. 4. Since these and other changes may be made within the spirit and scope of the inventive concepts disclosed, it is intended that the invention not be limited, except by the language of the following claims.

The embodiments of the invention in which an exclusive property or privilege is claimed are defined as follows:

1. A diesel engine exhaust filter and particulate incineration system in combination with a diesel engine having a normally unthrottled air induction system for admitting combustion air to the engine and an exhaust system for carrying off spent combustion products exhausted from the engine, said filter and incineration system comprising:

a combustion resistant filter disposed in the exhaust system and operative to collect and retain portions of the largely carbonaceous particulate matter contained in the engine exhaust products, said filter being capable of withstanding without substantial damage internal temperatures sufficient to burn the collected particulate matter, a throttle in the induction system and operable to restrict air flow into the engine to reduce the admittance of excess combustion air and thereby increase engine exhaust gas temperature, and means to actuate said throttle periodically during engine operation to an air flow restricting burn mode capable of raising the particulates in said filter to their combustion temperature under certain engine operating conditions and to maintain said throttle mode for an interval adequate to burn retained particulates in the filter.

2. A diesel engine exhaust filter and particulate incineration system in combination with a diesel engine having a normally unthrottled air induction system for admitting combustion air to the engine and an exhaust system for carrying off spent combustion products exhausted from the engine, said filter and incineration system comprising:

a combustion resistant filter disposed in the exhaust system and operative to collect and retain portions of the largely carbonaceous particulate matter contained in the engine exhaust products, said filter being capable of withstanding without substantial damage internal temperatures sufficient to burn the collected particulate matter, but being incapable of withstanding without damage sustained temperatures above a predetermined level higher than said particulate combustion temperatures, a throttle in the induction system and operable to restrict air flow into the engine to reduce the admittance of excess combustion air and thereby increase engine exhaust gas temperature, and actuating and control means responsive to the exhaust products temperature in said filter and operative to actuate said throttle periodically during engine operation to an air flow restricting burn mode capable of raising the particulates in said filter to their combustion temperature under certain engine operating conditions and to maintain said throttle mode for a predetermined interval adequate to burn retained particulates in the filter, said actuating and control means being further operative to modulate the throttle position during the periodic burn mode to prevent the combustion temperature within the filter from exceeding said predetermined temperature level above which damage to the filter may occur.

3. A diesel engine exhaust filter and particulate incineration system in combination with a diesel engine having a normally unthrottled air induction system for admitting combustion air to the engine and an exhaust system for carrying off spent combustion products exhausted from the engine, said filter and incineration system comprising:

a combustion resistant filter disposed in the exhaust system and operative to collect and retain portions of the largely carbonaceous particulate matter contained in the engine exhaust products, said filter being capable of withstanding without substantial damage internal temperatures sufficient to burn the collected particulate matter, a throttle in the induction system and operable to restrict air flow into the engine to reduce the admittance of excess combustion air and thereby increase engine exhaust gas temperature, and means to actuate said throttle periodically during engine operation to an air flow restricting burn mode capable of raising the particulates in said filter to their combustion temperature.

4. The combination of either claims 1, 2, or 3 wherein said means are further operative to modulate the throttle position during the periodic burn mode to maintain an adequate supply of excess combustion air under all engine operating conditions to avoid an excessive increase in exhaust smoke during the particulate burnoff.

5. The combination of claim 4 wherein said means are further operative to open the throttle whenever during the particulate burnoff the engine is operated in the full fuel mode so as to avoid limiting engine performance.

6. The combination of either claims 1, 2, or 3 and further including supplemental means for periodically increasing exhaust gas temperature, said supplemental means being operative in conjunction with said throttle to provide exhaust particulate combustion temperatures in said filter over a wider range of engine operating conditions.

* * * * *